United States Patent
Roberts et al.

(10) Patent No.: US 6,249,061 B1
(45) Date of Patent: Jun. 19, 2001

(54) SECURITY ARRANGEMENT

(75) Inventors: Mark F. Roberts, Metamora; Stephen J. Horner, Fenton, both of MI (US)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/299,062

(22) Filed: Apr. 23, 1999

(30) Foreign Application Priority Data

Apr. 23, 1998 (GB) .................................................. 9808561

(51) Int. Cl.[7] .................................................. B60R 25/00
(52) U.S. Cl. .......................... 307/10.3; 180/287; 340/426; 340/541
(58) Field of Search ................................... 307/10.3, 119, 307/10.2, 10.6; 180/287; 340/542, 541, 426, 427

(56) References Cited

U.S. PATENT DOCUMENTS

| 4,421,977 | * | 12/1983 | Kittredge | 235/101 |
| 4,449,605 | * | 5/1984 | Read | 180/287 |
| 4,803,460 | * | 2/1989 | Rhee et al. | 340/542 |
| 5,554,891 | * | 9/1996 | Shimizu et al. | 307/10.2 |
| 5,635,899 | * | 6/1997 | Carlo et al. | 340/426 |

* cited by examiner

*Primary Examiner*—Albert W. Paladini
(74) *Attorney, Agent, or Firm*—Andrus, Sceales, Starke & Sawall

(57) ABSTRACT

A security arrangement comprises a housing containing an electrical or electronic component, a resilient member being located within the housing and retained in a pre-stressed condition by a retaining member, the resilient member being located such that removal of the retaining member results in the resilient member flexing to a position in which the resilient member or a member carried thereby engages the component resulting in failure of the component.

13 Claims, 2 Drawing Sheets

SECURITY ARRANGEMENT

This invention relates to a security arrangement for use in reducing unauthorised use of a vehicle.

Vehicle theft is becoming increasingly common, one common technique for stealing a vehicle being to break into the vehicle, force the steering lock of the vehicle and start the vehicle by by-passing the ignition switch of the vehicle. It is an object of the invention to provide a security arrangement which reduces the risk of vehicle theft by preventing start-up of the vehicle by by-passing the vehicle ignition switch.

According to the present invention there is provided a security arrangement comprising a housing containing an electrical or electronic component, a resilient member being located within the housing and retained in a pre-stressed condition by a retaining member, the resilient member being located such that removal of the retaining member results in the resilient member flexing to a position in which the resilient member or a member carried thereby engages the component resulting in failure of the component.

The housing is intended to be mounted adjacent the steering column of the vehicle, and conveniently houses the ignition switch and part of the circuit used to control start-up of the engine of the vehicle. In order to by-pass the ignition switch of the vehicle as may occur if the vehicle is being stolen, the housing is opened in order to gain access to the electrical circuit used to start the vehicle's engine. Upon opening of the housing, the retaining member moves out of engagement with the resilient member, the resilient member then moving into engagement with a component of the circuit to cause the component to fail, thereby preventing use of the circuit in starting the engine of the vehicle.

Conveniently, the component is mounted adjacent an anvil. As a result, the engagement of the resilient member or member carried thereby with the component will damage or break the component rather than simply cause movement of the component, rendering the component inoperative/immeasurable.

The retaining member conveniently takes the form of a retaining pin carried by a removable part of the housing. The resilient member conveniently takes the form of a torsion spring.

Figure 1:
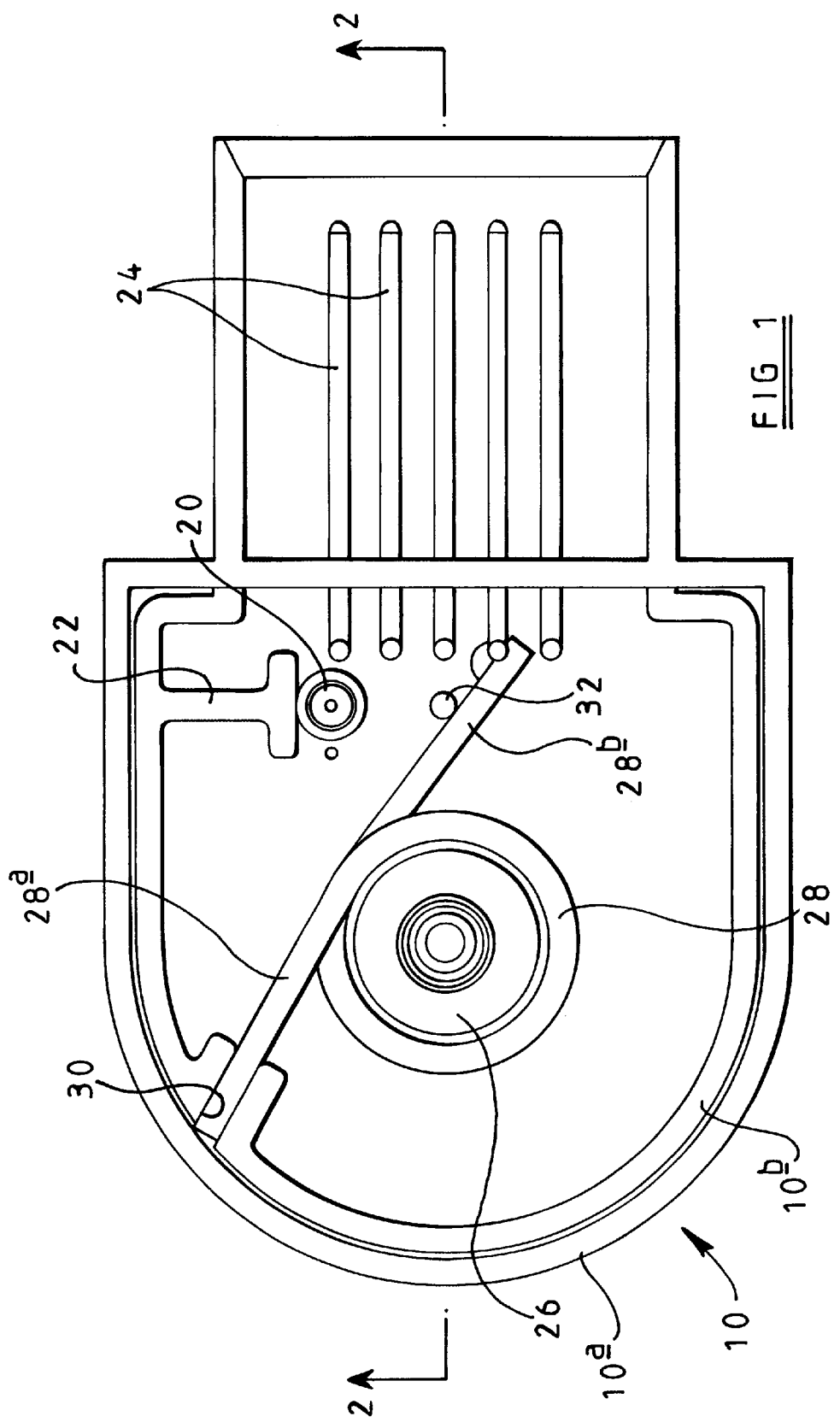
Figure 2:
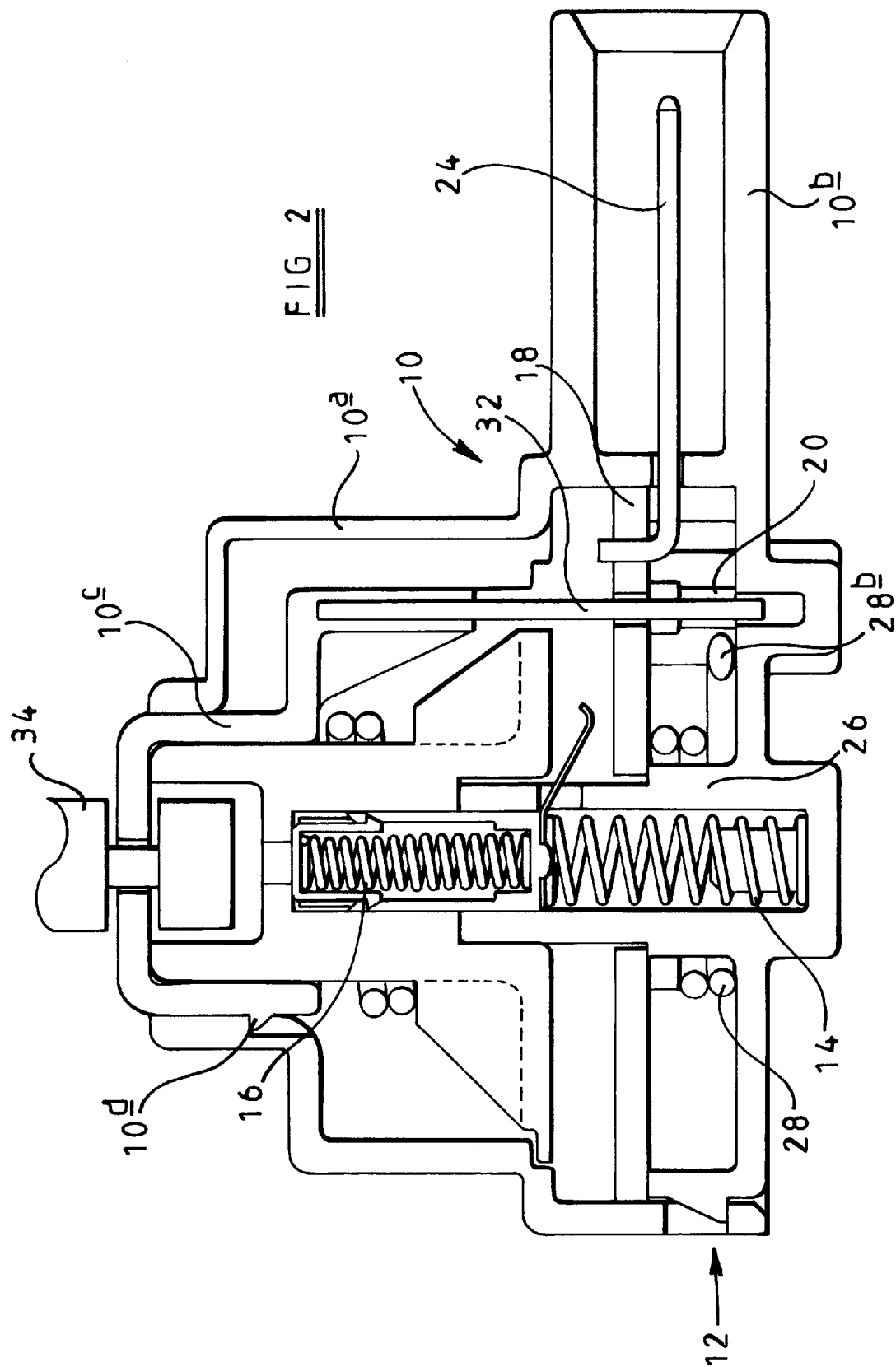

The invention will further be described, by way of example, with reference to the accompanying drawings, in which:

FIG. 1 is a view of a security arrangement in accordance with an embodiment of the invention; and FIG. 2 is a sectional view along the line 2—2 of FIG. 1.

The security arrangement illustrated in FIGS. 1 and 2 comprises a multi-part housing 10 including an upper part 10a and a lower part 10b the upper and lower parts 10a, 10b being arranged to be secured to one another by a snap-fit coupling arrangement 12. A third, inner housing part 10c is located within a chamber defined by the upper and lower housing parts 10a, 11b, the inner housing part 10c being biased by springs 14, 16 to the position shown in which a tooth 10d engages the upper housing part 10a. The housing 10 is conveniently intended to house the ignition switch of a vehicle together with part of the electrical circuit associated with the ignition switch (referred to hereinafter as the start-up control circuit), a lock cylinder 34 which is used to control the operation of the ignition switch extending through an opening provided in the inner part 10c.

A printed circuit board 18 is located within the chamber defined by the parts of the housing 10, the circuit board carrying conductive tracks and electrical/electronic components forming the start-up control circuit One of the components, a resistor, is illustrated in FIGS. 1 and 2 and is denoted by reference numeral 20. As illustrated most clearly in FIG. 1, the component 20 is mounted on the circuit board 18 in such a position that, when the circuit board 18 is attached to part 10b and located within the housing 10, the component 20 lies adjacent an inwardly extending protrusion or anvil 22 of the lower housing part 10b.

The circuit board 18 carries connection pins 24 which extend within a connection region of the housing 10 arranged to receive, in use, a correspondingly shaped plug to permit connection of the start-up control circuit to the remainder of the electrical circuits of the vehicle.

The lower housing part 10b defines a central hub 26 within which the spring 14 is located. The hub 26 also acts to locate a helical torsion spring 28, a first limb 28a of which is located within a recess 30 defined by part of the outer wall of the lower housing part 10b. The other limb 28b of the torsion spring 28 is held in a pre-stressed condition by a retaining pin 32 which is carried by inner housing part 10c. The torsion spring 28 is located such that the second limb 28b lies in the same plane as part of the component 20.

In use, the housing 10 is mounted adjacent the steering column of a vehicle, the start-up control circuit being connected to the other electrical circuits of the vehicle to control the start-up of the engine of the vehicle. Should someone attempt to start-up the vehicle by removing the lock cylinder 34 and tampering with the ignition switch, the housing part 10c would be moved in the direction of the lock cylinder 34, the inner housing part 10c being captive upon the lock cylinder in this orientation of the lock cylinder 34, resulting in deformation of the tooth 10d. The movement of the inner housing part 10c occurs, in part, under the action of the springs 14, 16 and results in the retaining pin 32 being moved by the inner housing part 10c to a position in which it no longer engages the second limb 28b of the torsion spring 28, thus movement of the torsion spring 28 towards its unstressed condition commences. Such flexing of the torsion spring 28 results in movement of the second limb 28b thereof towards the anvil 22, the second limb 28b moving into engagement with and damaging or fracturing the component 20 thus rendering the circuit inoperable. Clearly, with the circuit inoperable, start-up of the engine of the vehicle using the circuit simply by by-passing the ignition switch is not possible. The same result would occur if the housing were opened by separating the upper and lower housing parts 10a, 10b.

It will be appreciated that by supporting the component using an anvil, the movement of the spring 28 is more likely to result in damage to and failure of the component. If the anvil were not present, the impact of the spring with the component may simply result in deflection of the component with the circuit remaining operable.

Although in the description hereinbefore the component takes the form of a resistor, it will be appreciated that the torsion spring may be arranged to cause the failure of another type of component forming part of the start-up control circuit, for example a diode, a capacitor or an integrated circuit component.

What is claimed is:

1. A security arrangement comprising a housing containing an electrical or electronic component, an anvil which forms part of the housing, a resilient member being located within the housing and retained in a pre-stressed condition by a retaining member, the resilient member being located such that removal of the retaining member results in the resilient member flexing to a position in which the resilient member or a member carried thereby engages the component which is located adjacent the anvil, resulting in failure of the component, the anvil providing a supporting surface against which the component will be damaged when the resilient member engages the component.

2. The security arrangement as claimed in claim 1, further comprising a circuit board located within the housing, the circuit board carrying said electrical or electronic component.

3. The security arrangement as claimed in claim 2, wherein the component forms part of a start-up control circuit carried by the circuit board and said start up control circuit forms part of a vehicle ignition circuit.

4. The security arrangement as claimed in claim 1, the component being mounted between the anvil and the resilient member, or a member carried by the resilient member.

5. The security arrangement as claimed in claim 1, wherein the retaining member takes the form of a retaining pin carried by part of the housing.

6. The security arrangement as claimed in claim 5, wherein the housing includes a removable part, the retaining pin being carried by the removable part of the housing.

7. The security arrangement as claimed in claim 1, wherein the resilient member comprises a torsion spring.

8. A security arrangement comprising a housing containing an electrical or electronic component, an anvil for supporting the component, a resilient member being located within the housing and retained in a pre-stressed condition by a retaining member, the resilient member being located such that removal of the retaining member results in the resilient member flexing to a position in which the resilient member or a member carried thereby engages the component, which is located adjacent to the anvil, resulting in failure of the component, the anvil providing a supporting surface against which the component will be damaged when the resilient member engages the component.

9. The security arrangement as claimed in claim 8, further comprising a circuit board located within the housing, the circuit board carrying said electrical or electronic component.

10. The security arrangement as claimed in claim 9, wherein the component forms part of a start-up control circuit carried by the circuit board, and said start up control circuit forms part of a vehicle ignition circuit.

11. The security arrangement as claimed in claim 8, wherein the retaining member takes the form of a retaining pin carried by part of the housing.

12. The security arrangement as claimed in claim 11, wherein the housing include a removable part, the retaining pin being carried by the removable part of the housing.

13. The security arrangement as claimed in claim 8, wherein the resilient member comprises a torsion spring.

* * * * *